Sept. 22, 1964  R. W. EWING, JR  3,149,580
MONORAIL TRANSPORTATION ASSEMBLY
Filed Sept. 21, 1962  2 Sheets-Sheet 2
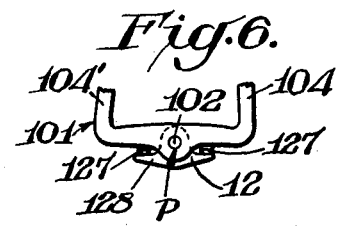
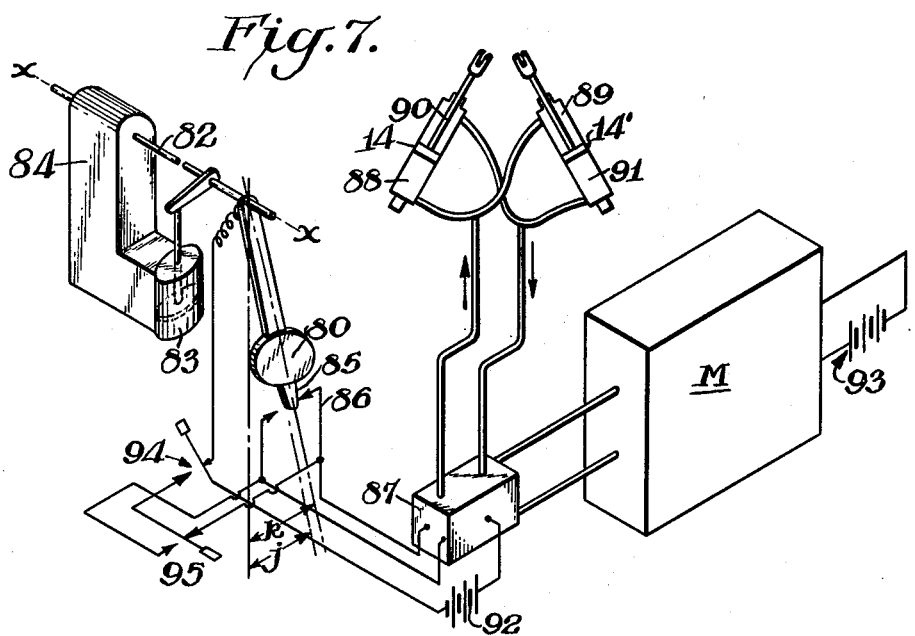
INVENTOR
Robert W. Ewing, Jr.
BY Connolly and Hutz
ATTORNEYS 本
United States Patent Office 3,149,580
Patented Sept. 22, 1964

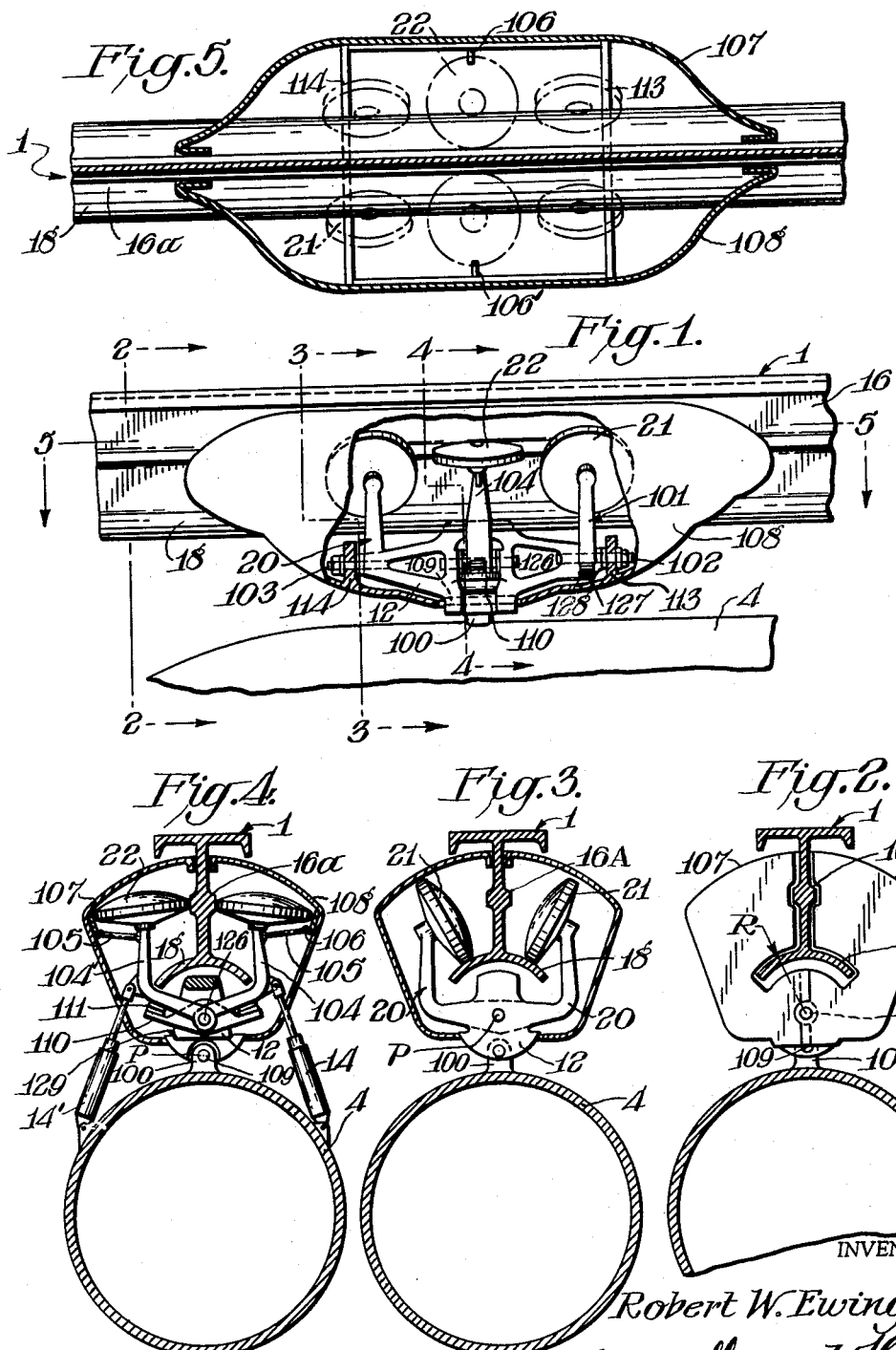

3,149,580
MONORAIL TRANSPORTATION ASSEMBLY
Robert W. Ewing, Jr., 4005 Greenmount Road,
Longwood, Wilmington 3, Del.
Filed Sept. 21, 1962, Ser. No. 225,303
13 Claims. (Cl. 104—93)

This invention relates to a high speed monorail system in which a car is suspended below a beam-like rail by means of traction wheels riding on the lower flanges of the rail. This invention is a continuation-in-part of my application Serial No. 56,050, filed September 14, 1960, now Patent No. 3,064,585.

One object of the invention herein described is to provide a truck for providing greater flexibility.

Another object is to provide a streamlined truck cowling to give a smooth air flow around the truck.

Other objects relate to traction wheels and stabilizing wheels as the suspension mechanism for the cars which mechanism can assume an angle relative to the track in response to a transverse pull of the car.

Other objects and advantages of the invention will become more apparent from a study of the following description and drawings wherein:

FIGURE 1 is a side view partially cut away showing a portion of the car at a point of attachment to the trucks and the streamlined cowling. There is also shown the traction and guide wheels as well as a portion of the track;

FIGURE 2 is a section along line 2—2 of FIGURE 1 showing the track and an end view of the cowling;

FIGURE 3 is a section along line 3—3 of FIGURE 1 showing the track and cowling, and a traction wheel yoke arm fixed to and forming a portion of the truck;

FIGURE 4 is a section along line 4—4 of FIGURE 1 showing the track, truck and cowling, the arms carrying the stabilizing wheels, and connections from these arms to the two sides of the cowling, and stabilizing cylinders attached to these arms;

FIGURE 5 is a longitudinal section along line 5—5 of FIGURE 1 showing the track and cowling only;

FIGURE 6 is a detail of a pivoted traction wheel yoke and a portion of the truck; and FIGURE 7 is a schematic view of a hydraulic system which is used in stabilizing the monorail cars against undesirable sway transversely of the track.

As seen in FIGURES 1 and 2, there is a rail 1 having a lower flange 18 which is curved downwardly (from the web) and which supports traction wheels 21 secured to truck 12 which in turn supports a passenger car 4.

The upper surface of the lower flange 18 of the rail 1 is curved at radius R about a longitudinal axis P, located on the center line of the track extended below the rail which can be further defined as the flange axis of curvature. The center line of pins 102, 103 and 126 which attach the pivoted traction wheel yoke 101, the cowling 108 and the stabilizing wheel arms 104 to the truck are on axis P. It is pointed out here that traction wheels 21, yokes 20 and 101, and truck 12 may assume different transverse angular positions relative to the track or rail 1 without moving the above-mentioned pins out of this position.

The car connector 100 for car 4 is shown attached to truck 12 at a lower point by pin 109 (FIGURE 4). However, the connector 100 can be attached to pin 126 instead of by pin 109.

Yoke 101 is pivotally attached to the truck 12 in order to facilitate adjustment of its position to accommodate minor unevenness in the rail flange surface. The amount of its angular movement relative to the truck, however, is limited by cushions or springs 127 bearing on yoke 101 and lower extensions 128 of truck 12 as shown better in FIGURES 1 and 6.

As shown in FIGURES 1 and 4, arms 104 and 104' carrying rotatably mounted stabilizing wheels 22 are pivotally attached to truck 12 by pin 126. If arms 104 and 104' were made as a single contiguous yoke, such construction would not compensate for any variation in the width or thickness of the enlarged section 16a (FIGURE 4) of track web on which the stabilizing wheels 21 travel. Therefore, the stabilizing wheel carrying arms are formed of two separate arms 104, 104' on a common pivot. Restraining springs 111 or other resilient means and a backup yoke 110, also pivoted on 126, tend to cause 104 and 104' to move in unison, but permit some flexibility as required by the irregularities in the surface or thickness of the web portion 16a.

The rotation of truck 12 relative to the track 1 and to arms 104, 104' is limited by lugs 129 (FIGURE 4) extending from the truck which engage yoke 110 if truck 12 assumes an extreme angular position relative to track 1.

The car 4 can swing slightly relative to the truck, but the total swing of the car relative to the track is limited and controlled by pressure cylinders 14, 14' connecting the stabilizer yoke arms to the car itself, the hydraulic fluid pressure in either end of these cylinders being manually or automatically controllable from within the car 4.

FIGURE 7 is a schematic representation of a hydraulic system which can be used with the present invention to stabilize the car against undesirable transverse sway due to transverse winds or other causes. Pendulum 80 mounted on axle 82 is shown in a position it would assume if the car were rounding a curve to the left. In this respect, angle K equals A which will be hereinafter defined with further reference to FIGURE 3 of the drawing. The swing of pendulum 80 is dampened by an oil-dash pot 83 mounted on axle 82 (on axis x—x). The dash pot 83 is held in a vertical position at all times by a gyroscopic stabilizer 84. The stabilizer is similar to that used in gyroscopic-compasses and need not be further described here. In view of a transverse wind from the right, the car has not swung through correct angle K but has assumed an angle J. Contact bar 85 of the pendulum therefore engages contact 86 attached to a car 4. This action shifts a solenoid switch 87 to supply oil under pressure to chambers 88 and 89 of cylinders 14, 14', also relieving the pressure in chamber 90 and chamber 91, thus rotating the car 4 outward about its wheel assemblies until J is increased to the correct angle K.

Hydraulic fluid is supplied under pressure by a conventional motor, pump, reservoir, and pressure control system M (FIGURE 7) energized by power source 93, and also provided in an electric power source 92 for energizing solenoid switch 87, by which means the oil is diverted to chambers 88, 89, or 90, 91 as needed.

By means of switch 94, valve 87 may be controlled manually through switch 95 instead of by pendulum 80 if desired.

At high speeds, the wind resistance of the car, truck and other exposed parts may easily contribute the major resistance to forward motion of the car. Since both the car and the truck may assume variable angular positions with respect to the track, any cowling which might be rigidly attached to the car or the truck must have sufficiently wide clearance with respect to the track to accommodate such variations.

Also, as the car traverses a curve, it will swing toward the outside of the curve, causing the car to rotate relative to the track. Since the point of suspension 109 of the car 4 (FIGURE 4) is below the truck axis of rotation P, the above action will also tend to produce rotation of the truck with the car. The magnitude of the car swinging will depend largely upon its speed.

It becomes apparent that in a system of this type, where the car and truck are permitted to swing within limits to permit a more natural angular position of the car in traversing a curve, clearance between any rigidly attached cowling and the track would be so great that its value in streamlining the truck and stabilizing wheels would be largely lost.

Certain features of the present invention make effective streamlining with a cowling possible.

A cowling 107, 108 shown better in FIGURES 1, 2, 4 and 5 is designed to completely enclose the upper portion of the truck, stabilizing wheels and attachments thereto with sufficient inside clearance to accommodate angular movement of the truck and traction wheels without any angular movement of the cowling relative to the track. The clearance between the cowling and the track is small, the edge contours of the cowling following closely the contours of the track. The outer contours of the cowling are designed to provide a smooth flow of air over and around the exposed surfaces as the car moves forward along the track (FIGURE 5).

The cowling is made in two sections 107 and 108 for ease of assembly and flexibility. These sections are attached by means of reinforcing ribs 113, 114 (FIGURES 1 and 5) to the truck 12 by pins 102 and 103 (FIGURE 1) whereby it is pivotally attached to the truck along axis P. At points on the upper portion of the cowling sections, lugs 106, 106' (FIGURE 5) are provided for attachment to the stabilizing wheel arms 104, 104' by links 105 (FIGURE 4). Hence, since pins 102 and 103 are fixed in relation to the rail center line and arms 104, 104' position the cowling sections equidistant from the rail 1 along their upper portions, the cowlings are held in a fixed relation with respect to the rail, and a close clearance between the two may be maintained. Consideration is given to the amount offset of the track from the position of the stabilizing wheels 22 and it was found that for even the sharpest curves anticipated in these rails little appreciable offset would occur. The effect of this offset could be compensated for by making the raised rib 16a heavier on the inside and shallower on the outside on the curved sections of the track.

The cars may be driven by electric motors carried by the stabilizing or traction wheels, by jet propulsion or other suitable means as described in the aforementioned parent application.

Obviously many modifications and variations of the present invention are possible in light of the above teachings. It is, therefore, to be understood that within the scope of the appended claims the invention may be practiced otherwise than as specifically described.

What is claimed is:

1. A monorail assembly comprising an overhead support, a rail secured to said support, a continuous lower flange on the rail, the upper surface of said lower flange being curved at a substantially fixed radius about a line on the rail center line extended below the rail which line is known as the flange axis of curvature, yoke type trucks, traction wheels rotatably mounted on said trucks which ride along the lower rail flange and support the truck below the rail, said wheels being disposed at angles such that their planes of rotation intersect substantially along the flange axis of curvature, thus providing for continuous rail contact along the center line of the traction wheel tread while the angle of the trucks may vary relative to the rail axis of symmetry, cars pivotally suspended from the trucks so that said cars may assume different angular positions with respect to the rail and trucks, a stabilizing yoke pivotally mounted on the truck along the flange axis of curvature, and wheels rotatably mounted on said stabilizing yoke which travel against the sides of the rail along areas above the lower flange, whereby said stabilizing yoke is retained in a substantially fixed position with respect to the rail.

2. The assembly of claim 1 wherein the stabilizing truck comprises two arms pivotally connected to the yoke and to each other along the flange axis of curvature, a stabilizing wheel being rotatably mounted on the free end of each arm which wheels travel against and along the sides of the rail above the lower flange, and resilient means acting on each arm to urge the arms toward the rail, which means permit sufficient freedom to accommodate minor variations in the rail surface.

3. The assembly of claim 1 wherein controllable length members connect the stabilizing yoke to the car to regulate the angular position of the car with respect to said yoke and hence with respect to the rail, said controllable length members consisting of hydraulic cylinder assemblies, and means within the car for controlling said controllable length members.

4. The monorail assembly of claim 1 wherein each traction wheel is connected to the one directly opposite to it on the other side of the rail by means of a yoke, two of which yokes are connected together by a longitudinal member to form the car supporting truck, one of said yokes being pivotally connected to said longitudinal truck member, thus providing for improved accommodation of the truck and traction wheels to minor irregularities in the rail load bearing surfaces.

5. The monorail assembly of claim 4 wherein resilient means are provided which bear upon said pivotally mounted yokes and upon extensions of the longitudinal truck member to urge said pivoted yoke to act in unison with said truck but permitting some freedom of movement to improve the accommodation of the truck and traction wheels to minor irregularities in the rail load bearing surface.

6. A monorail assembly comprising a car, a truck supporting said car, a rail, a continuous flange on said rail, the upper load bearing surface of which flange is curved at a constant radius about the flange axis of curvature which lies in the rail center line plane of symmetry, traction wheels rotatably mounted on said truck which wheels ride along said flange, said wheels being supported at angles such that their planes of rotation intersect along the flange axis of curvature enabling the periphery of the traction wheels to remain in contact with said rail flange while the truck may assume different angles relative to the rail center line plane of symmetry, stabilizing wheels rotatably mounted on arms pivotally connected to said truck which stabilizing wheels travel along and against the sides of said rail above the curved flange, a streamlined cowling covering the truck, the traction wheels, the stabilizing wheels, and a portion of the rail, with sufficient clearance within the cowling to permit the truck and traction wheels to assume different angular positions with respect to the rail, said cowling being pivotally supported by the truck at spaced apart points along a longitudinal center line axis of said truck, and a linkage connecting the cowling to a stabilizing wheel mounting arm to control the angular position of the cowling relative to the rail.

7. The monorail assembly of claim 6 wherein the streamlined cowling is composed of two sections, each of which is pivotally supported by the truck along the said longitudinal truck axis, and each of which cowling sections is connected by a link to one of the stabilizing wheel mounting arms.

8. A monorail assembly comprising a car, a rail above said car, a truck supporting said car by pivotal means, traction wheels rotatably mounted on said truck that travel along a lower flange of the rail in contact therewith, a stabilizing yoke pivotally mounted on said truck, stabilizing wheels rotatably mounted on said yoke which travel against and along the sides of the rail above the lower flange whereby the vertical, transverse and angular position of the yoke remains substantially fixed with respect to the rail, said car being capable of assuming different angles with respect to the rail axis of symmetry, and extensible means, the length of which is controllable from within the car, connecting the car to said stabilizing yoke to regulate the angular position of said car with respect to said yoke.

9. A monorail assembly comprising a car, a truck connected with said car, an overhead rail, traction wheels rotatably mounted on said truck which travel along the rail in constant contact therewith and support said truck, said car being pivotally supported by the truck and capable of assuming different angles with respect to the truck and the rail axis of symmetry, stabilizing wheels rotatably supported by said truck which travel along and against the sides of the rail, a streamlined cowling covering the truck, the traction wheels and the stabilizing wheels, pivoted means supporting and connecting said cowling to said truck at points along a longitudinal axis of said truck, and links connecting the cowling to the stabilizing wheel mounting.

10. The monorail assembly according to claim 6 wherein the cowling is pivotally supported by the truck at not less than two points along the flange axis of curvature, and links also connect the cowling with said stabilizing arms near the free ends of said stabilizing arms whereby the cowling is maintained in a fixed position with regard to a cross section of said rail along which it is carried enabling the maintenance of a close clearance between the edges of the cowling and the rail.

11. The assembly of claim 2 wherein car stabilizing means comprising controllable length members, the extension of which members is controllable from within the car, connect the car to the stabilizing yoke arms, thus providing means of controlling the angular position of the car relative to said stabilizing arms and the rail.

12. The monorail assembly of claim 10 wherein the cowling is formed of two sections, each of which is independently mounted on the truck and positioned by linkage connecting it to a stabilizing wheel arm.

13. The assembly according to claim 1 wherein extensions on the truck engage the stabilizing yoke when the truck assumes an extreme angular position, which extensions cooperate with the stabilizing yoke pivoting means to limit the angular movement of the truck with respect to the yoke and rail.

References Cited in the file of this patent
UNITED STATES PATENTS

| | | |
|---|---|---|
| 1,142,124 | Smith | June 8, 1915 |
| 1,389,545 | Glick | Aug. 30, 1921 |
| 1,422,394 | Wagner | July 11, 1922 |
| 1,785,315 | Kennedy | Dec. 16, 1930 |
| 1,875,535 | Whitney | Sept. 6, 1932 |
| 2,985,376 | Smith | May 23, 1961 |
| 3,014,434 | Cox | Dec. 26, 1961 |
| 3,044,416 | Reibel et al. | July 17, 1962 |
| 3,064,584 | Zebarth | Nov. 20, 1962 |
| 3,064,585 | Ewing | Nov. 20, 1962 |